United States Patent Office 3,424,739
Patented Jan. 28, 1969

3,424,739
AZO-CONTAINING ORGANO-METALLIC
COMPLEXES
Arthur C. Cope, Boston, and Robert W. Siekman,
Cambridge, Mass., assignors to Massachusetts Institute of Technology, Cambridge, Mass., a corporation of Massachusetts
No Drawing. Filed Jan. 19, 1966, Ser. No. 521,544
U.S. Cl. 260—148                                3 Claims
Int. Cl. C08f 1/28; C09b 45/24

ABSTRACT OF THE DISCLOSURE

Organo-metallic complexes useful as catalyst for the polymerization of olefins are formed by reacting a platinum or palladium salt with an aromatic azo compound.

---

This invention relates to organo-metallic complex compounds and relates in particular to stable aryl complexes that have been found to possess unusual catalytic properties for the polymerization of olefins.

The known aromatic metallo-organic complexes, such as the metallized azo dyestuffs, generally consist of chelate ring structures bonded to an aromatic benzene series ring. Metal salts are reacted with the aromatic azo compounds which possess reactive groups such as carbonyl, hydroxyl, and amino groups. The products of these reactions consist of a chelate structure wherein the metal atom is separated from the carbon atoms of the aromatic ring structure by one or more atoms of the aforementioned reactive groups.

We have discovered a new series of aryl metal-organic compounds wherein the metal atom in a chelate ring structure is bonded directly to the carbon atom of the aromatic ring by a covalent bond.

We have also discovered that our new compounds which possess the unusual metal to carbon bond have unusual catalytic properties for the polymerization of olefins. Of particular significance is the fact that these compounds are largely soluble in the organic solvents in which olefin polymerization takes place. Further, and of substantially equal importance is the fact that these materials, when used as catalysts for the polymerization of olefins, are substanitally recoverable.

It is, therefore, an object of the present invention to provide a metal-organic complex compound wherein a metal atom is bonded directly to the carbon atom of an aromatic ring structure by a covalent bond.

It is also an object of the present invention to provide a metal-organic complex compound wherein a metal atom is present within a chelate group that is bonded to an organic ring structure of the benzene series and wherein the metal atom contains a covalent bond to one carbon atom in the benzene ring structure.

An additional object of the present invention consists of an organo-metallic complex catalyst which may be utilized in the polymerization of olefins that consists of an aromatic ring structure of the benzene series and a chelate cyclic structure wherein the metal atom of the chelate is bonded directly to the carbon atom of at least one of the benzene ring structures by a covalent bond.

A further object of the present invention is to provide organo metallic complex catalysts for the polymerization of olefins that are substantially recoverable from the polymerization reaction.

A still further object of the present invention is to provide organo-metallic complex catalysts for the polymerization of olefins that are soluble in a liquid polymerization media.

A still further object of the present invention is to provide azobenzene-chelate compounds and derivatives thereof by the reaction of arylazo compounds or substituted arylazo compounds with metal halide salts to form complexes having at least one chelate structure with the chelated metal atom covalently bonded to the carbon atom in the position ortho to the azo group on the benzene ring structure.

Additional objects and advantageous features of the present invention will be obvious from the following description.

The present invention comprises the discovery and use of metal-organic complex compounds that are characterized by at least one chelate cyclic structure wherein the chelated metal atom is linked directly to a carbon atom of an aromatic ring structure through a covalent bond. These compounds all include the following generic heterocyclic structure:

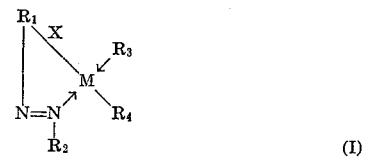

where:

$R_1$ represents an aromatic ring structure, such as a phenyl or naphthyl ring, that is substituted or unsubstituted, $R_2$ represents an alkyl, aryl, or aralkyl radical that is substituted or unsubstituted, $R_3$ represents any atom or group of atoms capable of sharing two electrons with the metal atom M to provide a stabilizing coordinate linkage. $R_3$ is represented by one of the halogen atoms chlorine or bromine (but not excluing fluorine or iodine), by a nitrogen atom of ammonia or an amine group, or by carbon monoxide, $R_4$ represents a halogen atom, particularly the halogen atoms chlorine and bromine (but not excluding fluorine and iodine), M represents a metal atom capable of forming chelate cyclic structures, particularly platinum, palladium, titanium, and nickel (but not excluding any of the transition metals), X represents a covalent metal to carbon bond between the metal atom M and a carbon atom in the ortho position of the ring structure of $R_1$.

A particular distinguishing feature between the complex chelate compounds of the present invention and the prior known aromatic metallo-organic complex materials is the covalent bond X within the chelate group. The prior known compounds generally consist of the reaction products of metal salts and aromatic organic substances which bear metal-reactive groups on aromatic ring structures. In these reactions, the reaction products consist of a chelated metal atom bonded only to the atoms of the reactive groups rather than a carbon atom within the aromatic ring structure.

The aromatic ring structure $R_1$ may be of unlimited complexity although it will usually consist of a phenyl radical. $R_2$ may consist of an aliphatic or aromatic structure of unlimited complexity but it too will usually be a phenyl radical. Either of these radicals, $R_1$ or $R_2$, may be further substituted.

$R_3$ and $R_4$ may both consist of halogen atoms which will usually be chlorine or bromine, since the atoms of these elements are the ones most likely to form appropriate covalent and coordinate bonds for the chelated metal atom. Where both $R_3$ and $R_4$ are halogen atoms, $R_3$ must be bonded to additional constituents by a covalent bond in order to provide a stabilizing dative bond to metal atom M. If $R_3$ and $R_4$ are both halogens, it is readily seen that they may be linked to a second metal atom to form the structure:

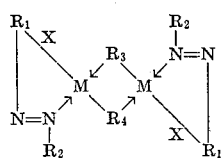

(II)

The complexity of the $R_1$, $R_2$, and $R_3$ components is limited only by the preferred utility of the compound since these radicals and groups have a direct effect on the physical and chemical characteristics of the compound. However, since the complexity in the present instance is a matter of choice, it is not a limiting feature of the present invention. We have found that methyl and ethyl radicals may be readily substituted on the ring structures $R_1$ and $R_2$ without materially detracting from the catalytic properties of this compound.

We have found that di-$\mu$-chloro-bis(azobenzene-2-C,N') diplatinum (II) and di-$\mu$-chloro-bis(azobenzene-2-C,N') dipalladium (II) both of which fall within the scope of the Formulas I and II above may be utilized as a catalyst in the polymerization of olefins. These compounds have the formula:

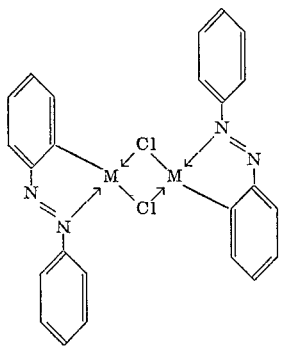

(III)

where: M represents platinum or palladium.

We have discovered the compounds represented by Formula III by introducing equimolar amounts of azobenzene and potassium tetrachloroplatinate (II) into a mixture of dioxane and water at ambient temperatures whereupon a reaction occurs which can be easily monitored using thin-layer chromotography. After two weeks at room temperature the reaction approaches completion. The water and dioxane may be removed by evaporation under reduced pressure. It was found that a portion of the residue is sparingly soluble in benzene, producing a dark red solution. A crystalline material obtained from the concentrated benzene solution is in the form of shiny, dark needles. The compound is stable, does not melt but decomposes at about 270° C. It is quite unaffected when boiled in concentrated hydrochloric acid.

It has also been found that palladium II dichloride reacts with azobenzene under similar conditions to form the analogous palladium compound which has similar properties to the platium compound. This reaction was remarkably rapid, approaching completion in a matter of hours.

Combustion analysis of the reaction products (azobenzene-Pd or Pt salts) gave an empirical composition of approximately $C_{12}H_{8-12}N_2MCl$ and established that straight forward coordination of azobenzene does not occur.

The infrared spectrum (KBr pellet) of the platinum compound (III) reveals major absorptions at 3050, 1580, 1450, 1360, 1320, 1305, 765, 720, and 695 cm.$^{-1}$; ultraviolet spectrum $\lambda_{Max}^{ETOH}$, (m$\mu(\epsilon)$), 257(34,400), 350(19,700), 373(sh) 390(sh), 440(6320), and 525(3870)

Compounds conforming to Formula III do not liberate azobenzene upon treatment with an excess of potassium cyanide, triphyenylphosphine, ammonia or amines. Rather, new complexes are produced. For example, isobutylamine or ammonia in benzene solutions of compounds that conform to Formula III to materials assigned the structure (IV) below:

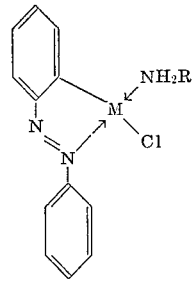

(IV)

where:

M represents platinum or palladium, and
R represents an alkyl radical or a hydrogen atom.

The ultraviolet spectrum of platinum compound (IV) where R=isobutyl and its infrared spectrum between about 1300 and 1600 cm.$^{-1}$ are similar to those of complex platinum compound (III). The melting point of this material was found to be between 162–164° C.

The azobenzene-platinum chloride complex (III) underwent decomposition upon treatment with lithium aluminum hydride in tetrahydrofuran to yield hydrazobenzene (90 percent).

The presence of a bond between the metal atom and the ortho carbon atom of the azobenzene molecule was established as follows. Compound III, where M=Pt, was treated with lithium aluminum deuteride. After decomposition of the reaction mixture with water, the resulting hydrazobenzene was oxidized with air or mercuric oxide to azobenzene for convenience of analysis. Mass spectrometric analysis of azobenzene from two decompositions showed the following deuterium content: (A) 23% $d_0$, 75% $d_1$, 2% $d_2$ species; (B) 24% $d_0$, 74% $d_1$, 2% $d_2$ species. When the reduction of compound III was modified by using deuterium oxide to hydrolyze the reaction mixture, the azobenzene was found to contain 4% $d_0$, 93% $d_1$, and 3% $d_2$ species.

Azobenzene-2-$d_1$, azobenzene-3-$d_1$, and azobenzene-4-$d_1$ were synthesized by standard reaction sequences such as are set forth by T. Prosser and E. Eliel, J. Am. Chem. Soc. 79, page 2544 (1957) and H. Anspon, "Organic Syntheses," Coll., vol. III, John Wiley and Sons, Inc., New York, N.Y., 1955, page 711. Nuclear magnetic resonance spectra of these deuterated azobenzene differ slightly from each other and the spectrum of the material obtained from Compound III was identical with the spectrum of azobenzene-2-$d_1$.

Compounds represented by Formula V below were prepared by employing 3,5,3',5'-tetramethylazobenzene in place of azobenzene in the reaction media.

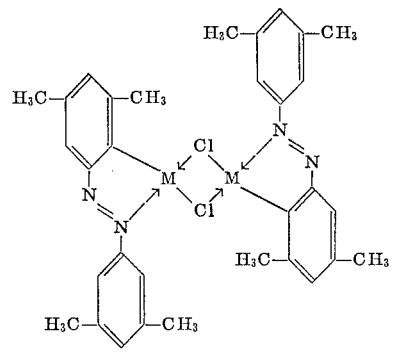

(V)

where: M represents platinum or palladium.

These compounds (Formula V) were found to have melting points of between 270–275° C. and decomposition temperatures of about 295° C. They were prepared and decomposed with lithium aluminum deuteride to yield 3,5,3′,5′-tetramethylazobenzene after work-up with deuterium oxide and oxidation of the product with mercuric oxide. The platinum complex (V, M=Pt) afforded an azo compound in 89% yield which was found by mass spectrometry to contain 8% $d_0$ and 91% $d_1$ species. The tetramethylazobenzene obtained in like manner from the palladium compound contained 5% $d_0$ and 94% $d_1$ species. Both samples of tetramethylazobenzene showed nuclear magnetic resonance absorption for the protons ortho to the nitrogen atoms as a singlet at 7.45 p.p.m. (below tetramethylsilane), while the protons para to the nitrogen atoms absorbed at 7.0 p.p.m. The ratio of the areas of absorption was ortho/para=3:2 for both samples, indicating that deuterium had been substituted in place of the metal atom in the ortho position of the teramethylazobenzene.

The reaction of palladium (II) dichloride with azobenzene and its derivatives has been found to be more rapid than the reaction of platinum salts. For instance, the compound represented by the Formula VI below (M.P. 210–215° C.), was derived from 2,2′-diethylazobenzene and was formed (95% yield) after 2 hours at room temperature in methanol.

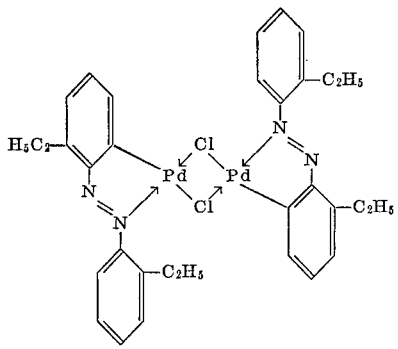

(VI)

By employing variously substituted azobenene compounds with tetrachloroplatinate (II) and palladium (II) chloride to form compounds analogous in structure to Formulas V and VI and by contacting these compounds with isobutylamine in benzene, the following complex compounds were derived:

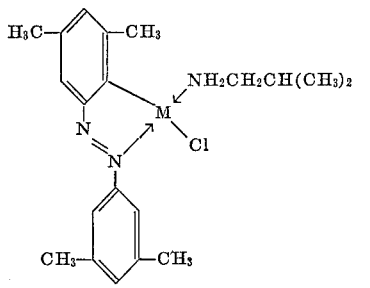

(VII)

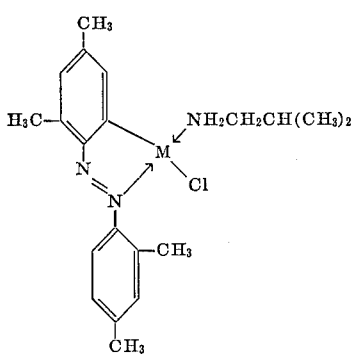

(VIII)

where: M=Pt or Pd.

Platinum and palladium complex argano-metallic compounds corresponding to the Formulation III above were stirred in benzene. This solution was subjected to 40 lbs./sq. in. pressure of carbon monoxide at room temperature. After two hours a compound having structure (IX) below was isolated

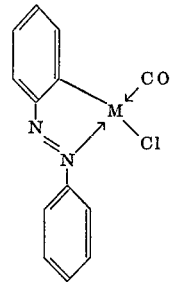

(IX)

where: M=Pt or Pd.

The very strong infrared absorption peak at about 2120 cm.$^{-1}$ for the platinum version of Compound IX is in the region of absorption of other platinum carbonyl compounds (see R. Irving and E. Magnusson, J. Chem. Soc., 1958, page 2283). The nuclear magnetic resonance spectrum resembles that of the isobutylamine derivative (IV, R=isobutyl) in the aromatic region.

A structural modification of the ligand which proved to be informative was the use of an alkyl-aryl azo compound to form a complex with palladium (II) dichloride. t-Butylazobenzene was found to react with palladium (III) dichloride to yield the Compound X as shown below:

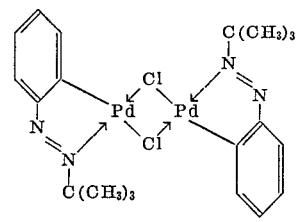

(X)

Compound X is soluble in a variety of organic solvents. It may be purified by chromatography through silicic acid and by the recrystallization to a melting point of 216–218° C. This material has a tendency to vaporize when heated. The nuclear magnetic spectrum of Compound X reflects its structure in that the multiplet of aromatic protons from 6.9 to 7.8 p.p.m. is found by integration to account for four protons compared to nine protons in a singlet at 1.65 p.p.m. assigned to the t-butyl group.

All of the above-described compounds are found to have a catalytic effect on the polymerization of olefins. Many of these new and unique materials when utilized as catalyst for the polymerization of ethylene in a solvent such as benzene do not combine with the products of polymerization but are partially or nearly completely recovered and many may be reused. This property is of particular significance where the complex contains a rare and costly metal such as platinum or palladium.

The invention, however, is not confined to metal organic complex compounds of the metals platinum and palladium alone since it is feasible to chelate others of the transition metals and the organo metallic compounds such as those set forth in any of the above-described formulas wherein a transition metal is represented by M will have catalytic value in the polymerization of the olefins. The utilization of the metals titanium and nickel in this respect are of particular interest since they are transition metals of known catalystic properties.

The following specific examples illustrate the specific parameters of making and utilizing the organo-metallic compound of the present invention but in no way limit the scope of the claims to the exact embodiments set forth. Examples 1 through 7 illustrate the preparation of organo-metallic complex components which fall within the scope of the present invention and Examples 8 and 9 illustrate utility.

EXAMPLE 1

Potassium tetrachloroplatinate (II), as obtained from Engelhard Industries, was dissolved in water and a mixture of about 60 parts dioxane and 40 parts water by volume were added until there was enough to give a homogeneous solution. A molar equivalent of azobenzene dissolved in dioxane was then added and dixane and/or water was added to the reaction mixture to make a homogeneous solution. This was allowed to stand at room temperature for about two weeks. After about 12 hours the solution became dark.

The complex was isolated by evaporating the reaction mixture to dryness on a rotary evaporator at about 20 mm. pressure. The residue was repeatedly extracted with boiling benzene until the benzene no longer became colored. The combined benzene extracts were slowly concentrated by evaporation at atmospheric pressure which caused precipitation of small crystals of the desired material. In this way, azobenzene (1.05 g.) and potassium tetrachloroplatinate (II) (2.395 g.) were allowed to stand at room temperature in a mixture of 110 ml. of dioxane and 110 ml. of water for about 2 months. The weight of isolated di - $\mu$ - chloro-bis(azobenzene-2-C,N') diplatinum (II) (Compound III) was 1.28 g. (54%).

EXAMPLE 2

The residue from Example 1 remaining after benzene extraction was treated with a benzene solution of isobutylamine. Solvent and excess amine were evaporated on a rotary evaporator under reduced pressure. The resulting solid was dissolved in carbon tetrachloride and was then purified by chromatography through a column of silicic acid.

A red band was collected which contained 360 mg. (13%) of chloro-(azobenzene-2-C-N')(2-methyl-1-aminopropane) (II).

EXAMPLE 3

Potassium tetrachloroplatinate (II) (3.0 g.) and azobenzene (1.32 g.) were stirred for 16 days at room temperature in a solution of methanol (60 ml.) and water (60 ml.).

The solvents were removed on a rotary evaporator under reduced pressure. The residues were boiled with benzene and then were filtered. After extraction with benzene the remaining solid material was boiled with tetrahydrofuran. Almost all of the solid residue from this extraction was water soluble and was discarded. The amount of platinum Compound III obtained as crystals from benzene was 1.82 g. (61%). The remtaining material was obtained as a black solid of variable platinum content which appeared to be partly polymeric and in part due to reaction of solvent with potassium chloroplatinate (II).

EXAMPLE 4

The reaction of palladium (II) dichloride with azo compounds was found to proceed well in methanol. The palladium salt initially was not dissolved completely but dissolved as the reaction proceeded. Equimolar amounts of the reactants were usually stirred at room temperature overnight. The products usually precipitated from the methanol solution and could be recovered by filtration in 94% yield. After washing with ether and water, the precipitate was recrystallized from benzene and dried in a high vacuum to give di-$\mu$-chloro-bis(azobenzene-2-C,N') dipalladium (II). The purity of paladium complexes obtained in this way was quite high. The main impurity isolated was a small amount parent azo compound.

EXAMPLE 5

Monomeric isobutylamine derivatives of palladium complexes were prepared by stirring the dimeric complex with excess isobutylamine in benzene until all material was in solution (1–2 min.). The solution was then evaporated to dryness on a rotary evaporator under reduced pressure. In this way chloro(azobenzene - 2 - C,N') (2-methyl-1-aminopropane) palladium (II) was obtained in quantitative yield. It was recrystallized from chloroform-pentane solution.

EXAMPLE 6

The platinum complex of Compound III (0.116 g.) was stirred in 100 ml. of benzene in a glass pressure bottle at a pressure of 40 lb./sq. in. of carbon monoxide. After 2 hours the red solution was evaporated to dryness to yield a stable solid. The product was soluble in ether, carbon tetrachloride and other organic solvents. It was purified by column chromatography with silicic acid (40 g.) using carbon tetrachloride containing 1% methanol as the eluent. A red band was collected which contained 0.111 g. (90%) of product. Chloro(azobenzene-2-C,N') carbonylplatinum (II) (Compound IX) was recrystallized from chloroform-pentane solution or from carbon tetrachloride solution.

EXAMPLE 7

Di-$\mu$-chloro-bis[1',1' - dimethylethyl(phenyl)diimide-2-C,N'] dipalladium (II).—Palladium (II) dichloride (1.51 g.) and t-butylazobenzene (1.38 g.) were stirred in about 50 ml. of methanol overnight at room temperature. The reaction mixture was evaporated to dryness under reduced pressure on a rotary evaporator. The residue was extacted with ether. The ether soluble material (1.57 g., 61%) was purified by chromatography through silicic acid with carbon tetrachloride as the eluent. A yellow band was collected in several fractions which were later combined (0.831 g.) and recrystallized from ether. The compound obtained in this way had M.P. 217–219° with a crystal transformation at about 211°.

Purification could be accomplished by sublimation of this compound at 160° (0.2 mm.), but decomposition and consequent waste of material was large. The sublimed complex had M.P. 217–219°, with no change at 211°.

In creating the above-described compounds represented by the Formulations III through X, the azobenzene (or alkyl substituted azobenzene) and metal salt reaction was effected in a mixture of dioxane and water. This solvent combination was chosen to allow the preparation of a homogeneous reaction mixture. The use of this specific medium is not critical and, in fact, aqueous acetic acid and aqueous methanol are used as solvent systems. Any stable liquid solvent that does not enter into or grossly effect the reaction obviously may be employed. In the case of the platinum and palladium chloride salts we have found it to be necessary to utilize the bivalent salts. The tetravalent salts of these compounds fail to produce the desired organo-metallic complex structures.

The derivative of the di-$\mu$-halo-bis(azobenzene-2-C,N') dimetallic (II) compound that is found to be most attractive for its catalytic effect on the polymerization of olefins (mainly ethylene) is the halocarbonyl(o-(phenylazo) phenyl) metal (II) compound. The following are descriptions of specific examples of the utilization of these materials.

EXAMPLE 8

Nineteen mg. of chlorocarbonyl[o-(phenylazo)phenyl] platinum (II) shown above as Formula IX, made in the manner described above was dissolved in 50 ml. of benzene. The solution was placed in a one liter pressure bottle with a magnetic stirring bar coated with Teflon. The bottle was flushed several times with ethylene and was then filled with ethylene to a pressure of approximately 40 lb./sq. in. The contents of the bottle were stirred at room temperature for 13 hours.

The resulting solution was evaporated on a rotary evaporator at water aspirator pressure (about 15 mm. of Hg). A red, glassy residue was obtained which weighed 84 mg. Of this material, 75 mg. was soluble in pentane. The remaining 9 mg. was di-μ-chloro-bis(azobenzene-2-C-N') platinum (II) (Compound III), which was formed from the carbonyl derivative when the latter was allowed to stand in solution.

Column chromatography was used to separate the hydrocarbon material from the catalysts (Compound IX). The column material was silicic acid and the eluting solvent was carbon tetrachloride. The first 50 ml. fraction contained 37 mg. of a colorless oil.

Gas-liquid chromatography indicated that the product was a mixture of a great many components. The retention times of the components of the product were compared with the retention times of various saturated, normal hydrocarbons. The major components of the polymerization of ethylene catalyzed by Compound IX correspond in retention time to hydrocarbons of twenty to twenty-two carbon atoms.

Mass spectrometry of the above product confirmed the molecular weight determination of the gas chromatographic results. The spectrum showed a fairly abrupt drop in peak intensity above a mass-to-charge ($m/e$) ratio of 300. A molecular weight of 300 is appropriate for molecules of 20 to 22 carbon atoms. The pattern of fragmentation suggests further unsaturation. Peaks of diminished intensity continued from a mass of about 300 to about 500.

Example 9

A chloro carbonyl (o-(phenylazo)phenyl) platinum (II) benzene solution such as that employed in Example 8 (19 mg. and 50 ml.) was placed in a glass liner of a 1.5 liter high pressure bomb. Ethylene was introduced into the vessel at a pressure of 1125 lb./sq. in. for 24-hour period. The bomb was then opened and the benzene solution was evaporated on a rotary evaporator at water aspirator pressure. A red oil (301 mg.) remained, which had an infrared absorption at 2120 cm.$^{-1}$ indicating that the metal carbonyl compound had remained intact. This product was then dissolved in pentane and allowed to stand at room temperature for approximately 3 weeks. A red, oily material was separated from the solution. The solvent was removed and the oil was kept at 15 ml. pressure for 2 hours. The weight of the residue was now 191 mg. The metal carbonyl bond had disappeared from the infrared spectrum. It was found that the platinum carbonyl complex is unstable in solution. Chloroform was removed under reduced pressure 11 days later. The residue was fractionated by partial solution in pentane. The solvent was removed from the pentane extract which was then dissolved in carbon tetrachloride. About 1 gram of silicic acid was added to this solution accompanied by stirring. The slurry was then filtered and the solvent was removed from the filtrate which consisted of 141 mg. of an oil. Most of the platinum complex remained on the silicic acid.

We claim:

1. An organo-metallic complex compound, having the chelate cyclic structure

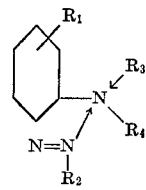

where:
$R_1$ is a hydrogen or lower alkyl substituents on the benzene ring,
$R_2$ is a benzene ring, lower alkyl substituted benzene ring or tertiary lower alkyl group,
$R_3$ is a halogen atom, ammonia, carbon monoxide, or alkyl amino group,
$R_4$ is an halogen atom,
M is a metal selected from the group consisting of platinum and palladium.

2. The organo-metallic complex compound as set forth by claim 1 wherein $R_3$ is an atom or a group of atoms from the group of chlorine, bromine, carbon monoxide and the nitrogen atom of ammonia or an amine.

3. The organo-metallic complex compound as set forth by claim 1 wherein $R_3$ and $R_4$ are both halogen atoms attached to a second chelate cyclic structure so as to form the structure

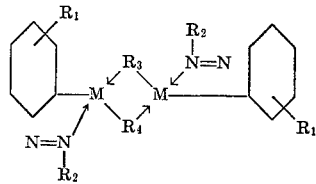

References Cited

UNITED STATES PATENTS 3,300,472   1/1969   Kleiman et al. _____ 260—149

OTHER REFERENCES

Krauss et al.: Ber. Deut. Chem., volume 95, pages 1023 to 1030, (1962).

FLOYD D. HIGEL, Primary Examiner.

U.S. Cl. X.R.

260—149, 145, 94.9; 252—431